United States Patent [19]

Anderson

[11] 4,147,406
[45] Apr. 3, 1979

[54] FIBER OPTIC CABLE

[75] Inventor: Gene S. Anderson, Batavia, Ill.

[73] Assignee: Belden Corporation, Geneva, Ill.

[21] Appl. No.: 735,402

[22] Filed: Oct. 26, 1976

[51] Int. Cl.² .............................................. G02B 5/14
[52] U.S. Cl. ................................................. 350/96.23
[58] Field of Search ............. 350/96 B, 96 BC, 96 R, 350/96 WG, 96.23; 174/108, 109, 113; 57/139

[56] References Cited

U.S. PATENT DOCUMENTS

| 3,766,307 | 10/1973 | Andrews | 350/96 B |
| 3,855,897 | 12/1974 | Takahashi et al. | 350/96 B |

FOREIGN PATENT DOCUMENTS

| 2012293 | 9/1971 | Fed. Rep. of Germany | 350/96 B |
| 2291508 | 6/1976 | France | 350/96 B |
| 2294460 | 7/1976 | France | 350/96 B |
| 2296192 | 7/1976 | France | 350/96 B |
| 1438074 | 6/1976 | United Kingdom | 350/96 B |

*Primary Examiner*—Jon W. Henry
*Attorney, Agent, or Firm*—Fitch, Even & Tabin

[57] ABSTRACT

A flexible fiber optic cable and method of making same are disclosed wherein one or more fiber optic bundles are cabled along the length of an axial strength member and a spiral cut nonmetallic tube is applied coaxially over the fiber optic core, followed by a thin walled jacket formed coaxially over the spiral cut tubing. The spiral tube and jacket form a protective jacketing which prevents crushing of the fiber optic elements while facilitating flexing of the cable.

5 Claims, 4 Drawing Figures

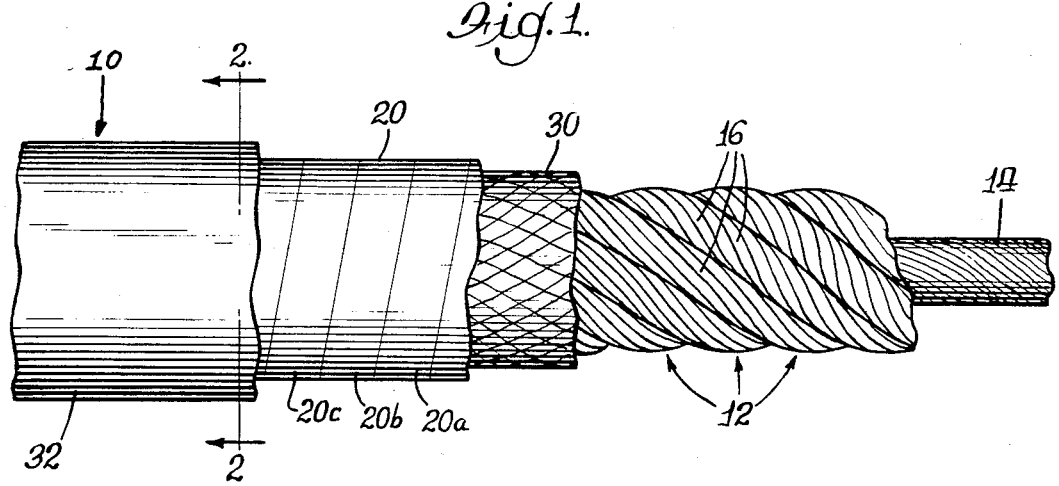
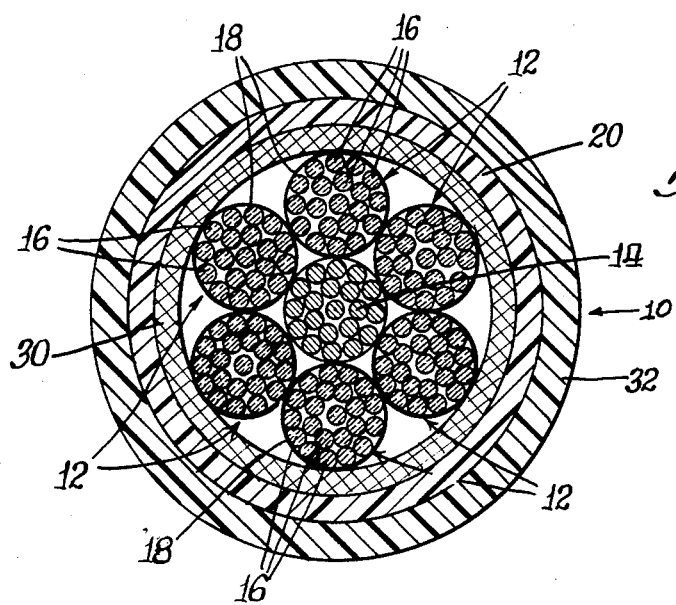
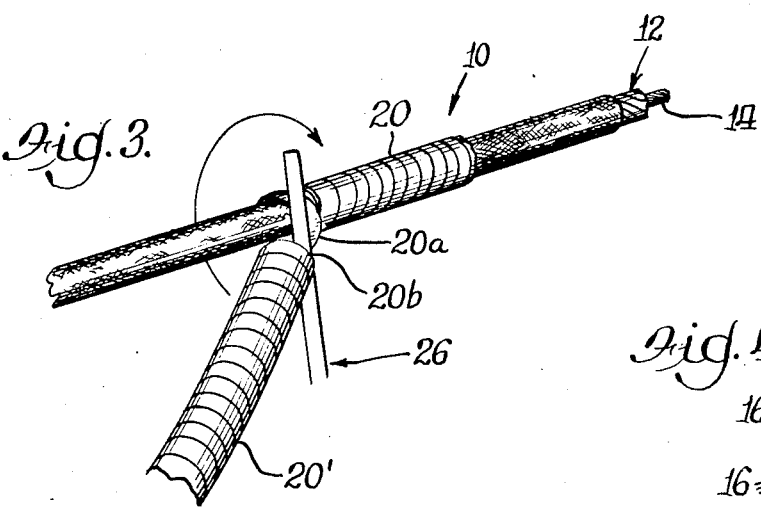
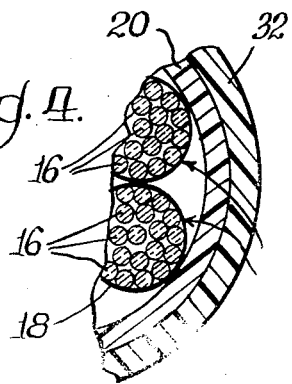

FIBER OPTIC CABLE

The present invention relates generally to fiber optic cables, and more particularly to a fiber optic cable and method of making the same wherein a spiral cut nonmetallic tube is applied in coaxial relation over a plurality of fiber optic elements cabled along an axial strength member, a thin walled jacket being applied coaxially over the spiral cut tube and cooperating therewith to prevent crushing of the fiber optic elements while facilitating flexing of the fiber optic cable.

Much effort has been expended in recent years in the design and development of low-loss fiber optic cables for various applications, including the field of communications. Low-loss fiber optic cables offer many desirable advantages over metallic conductors including use for long distance transmission without repeaters, immunity from crosstalk, greater bandwidth capabilities, lighter weight, and potential for lower cost signal transmission systems.

In practice, however, it has been found that significant problems are presented which inhibit utilization of the desirable features of fiber optic cables over metallic conductors. One basic problem in fiber optic cables is the inherent fragility of glass fibers so that the optic cables made therefrom are flexible and can withstand bending, twisting, impact, vibration, etc. The basic approach has been to provide means for strengthening and buffering the individual optic fiber elements so that subsequent bundling, cabling and field usage will not casue fiber brakage or have adverse effect on the optical properties of the fibers.

It is generally acknowledged that failures in the glass fiber elements ultimately stem from surface flaws or imperfections in the fiber elements. The stress concentration at such surface flaws can be many times greater than the nominal stress at the same point, and since there is no axial yielding in the glass fibers, the stress at the surface flaws cannot be relieved. If a high tensile stress is applied to the glass fibers, the surface flaws may propagate with eventual failure of the fibers. Thus, it is necessary that the fiber optic elements be protected from crushing forces or other forces which might nick the surfaces of the fiber optic elements to create points of high stress concentration, while at the same time providing a flexible fiber optic cable.

It is a general object of the present invention to provide a fiber optic cable which is highly resistant to crushing and which exhibits a high degree of flexibility. A more specific object of the present invention is to provide a fiber optic cable and method of making the same wherein a spiral cut nonmetallic tube is applied over a glass fiber optic core comprised of one or more fiber optic element bundles cabled along an axial strength member having greater tensile strength and lower elongation per unit length than the fiber optic elements so that the axial loading to which the cable may be subjected is taken by the axial strength member rather than subjecting the fiber optic bundles to undesirably high tensile forces. A feature of the present invention lies in the provision of a thin walled nonmetallic jacket over the spiral cut nonmetallic tube and, optionally, a textile braid or serve layer between the cabled fiber optic bundles and the spiral cut tubing for improved abrasion resistance while maintaining desired flexibility in the cable.

In accordance with the invention, the spiral cut nonmetallic tubing is applied in one continuous length by use of a conventional rotating guide which may take the form of a planetary cabler or modified taping head of known design adapted to progressively separate adjacent spiral convolutions of the tubing and effect movement of the tubing in a manner to coaxially encase one or more fiber optic element bundles cabled along an axial strength member. A Nonmetallic filler material, such as textile braid or serve, may be disposed between the fiber optic element bundles and the spiral cut tubing for improved abrasion resistance.

The various objects and advantages of the present invention, together with the organization and manner of operation thereof, will become apparent from the following detailed description of the invention when taken in connection with the accompanying drawing wherein like reference numerals designate like elements throughout the several views, and wherein:

FIG. 1 illustrates, in an enlarged scale, a length of fiber optic cable constructed in accordance with the present invention, portions of the cable being stripped back to expose underlying layers and elements;

FIG. 2 is a transverse sectional view of the fiber optic cable of FIG. 1, taken substantially along the line 2—2 and looking in the direction of the arrows;

FIG. 3 is a perspective view illustrating the method of applying the spiral cut protective tube shield along the length of a fiber optic core; and FIG. 4 is a partial transverse sectional view of the fiber optic cable of FIG. 1 but without the braid or serve layer between the cable fiber optic bundles and the spiral cut tubing layer.

Referring now to the drawing, and in particular to FIGS. 1 and 2, a fiber optic cable constructed in accordance with the present invention is indicated generally at 10. In a preferred embodiment of the fiber optic cable 10, a plurality of fiber optic bundles, each of which is indicated generally at 12, are cabled in helical fashion along the length of an axially extending nonmetallic strength member 14. In the illustrated embodiment, six fiber optic bundles 12 are cabled about the axial strength member 14. Each fiber optic bundle 12 includes one or more monofilament fiber optic elements 16 made from conventional fiber optic meterial such as glass. Each fiber optic bundle 12 may, for example, include twenty monofilament fiber optic elements 16 which are retained in an elongate bundle by a coaxial sheath 18 preferably made from a polymer containing poly acrylonitrile. Such sheaths provide substantial crush resistance for the fiber optic elements, have low elongation at yield, can be extruded with little shrink back, and facilitate stripping to thus simplify termination of the fiber optic cable 10.

The axial strength member 14 extends the full length of the cable 10 and has a tensile strength greater then the tensile strength of the monofilament fiber optic elements 16, the member 14 also having lower elongation per unit length than the fiber optic elements so that the axial loading to which the cable 10 may be subjected is taken by the axial strength member 14 rather than subjecting the fiber optic bundles to undesirably high tensile forces. The axial strength member 14 preferably comprises a high strength yarn made from a suitable aramid, an example of which is KEVLAR, a product of DuPont Company. The fiber optic bundles 12 may be cabled about the axial strength member 14 by conventional known techniques. The fiber optic bundles 12 and associated carrier or strength member 14 comprise the fiber optic core of the cable 10.

In accordance with the present invention, a spiral cut nonmetallic tube 20 is disposed coaxially over and along the length of the fiber optic core as best seen in FIG. 3. The spiral cut tube 20 serves as a protective coaxial shield layer and is made of a suitable high impact resistant material such as a suitable plastic wherein adjacent helical convolutions, as indicated at 20a, 20b, 20c, etc., are normally in contacting relation when the axis of cable 10 is straight but which allows flexing of the cable 10 while being resistant to radial crushing. The spiral cut tube 20 may comprise a spirally wound nonmetallic strip material.

With reference to FIG. 3, the spiral wound nonmetallic tube 20 may be applied coaxially over the fiber optic core by means of a conventional rotating guide as indicated schematically at 26 projecting outwardly from and rotatable about the axis of a length of cable core. The rotating guide 26 may comprise a portion of a conventional planetary cabler or modified taping head of known design. The rotating guide 26 is adapted to rotate the non-applied portion of the spiral cut tube, such as indicated at 20', about the axis of a length of the fiber optic core which is passed from a suitable supply source (not shown) to a suitable take-up means (not shown) so as to position a reach of the fiber optic core in a substantially horizontal position coincident with the axis of rotation of the guide 26.

With a reach of fiber optic core being supported coincident with the axis of rotation of the guide 26, the guide is operative to project between adjacent convolutions of the spiral cut tube 20, such as 20a and 20b, and progressively separate successive convolutions simultaneously with rotation of the tube portion 20' about the axis of the fixed reach of fiber optic core so that the spiral tube is effectively wrapped coaxially about the fiber optic core, the fiber optic core and coaxially disposed tube 20 being thereafter taken up by the taken-up means (not shown). As shown, the spiral cut tube 20 is applied to the fiber optic core in one continuous length.

In an alternative construction of the fiber optic cable 10, a nonmetallic textile braid or serve, indicated at 30 in FIGS. 1 and 2, is disposed coaxially about the fiber optic core comprising the fiber optic bundles 12 cabled along the axial strength member 14. The textile braid or serve 30 may be applied coaxially on the fiber optic bundles 12 by conventional cabling techniques so that the spiral tube 20 is thereafter formed coaxially over the braid layer 30. The textile braid or serve provides improved abrasion resistance for the fiber optic bundles 12 of fiber optic cable 10.

After applying the spiral cut tube 20, either coaxially on the fiber optic bundles 12 or on the textile braid 30 when disposed on the fiber optic bundles 12, a thin walled jacket 32 is formed coaxially over the outer peripheral surface of the tube 20 along the full longitudinal length of the cable 10. The jacket 32 is made of a suitable flexible plastic material and may be extruded over the spiral cut tube 20 after applying the tube 20 to the fiber optic core.

Thus, in accordance with the present invention, a fiber optic cable and method of making the same are provided wherein the fiber optic cable has an axial strength member which takes a substantial portion of any axial loads on the cable and thereby prevents the fiber optic elements 16 from being subjected to undesirably high tensile forces. The fiber optic cable 10 has a spiral cut tube 20 disposed coaxially over the fiber optic bundles so as to protect and prevent crushing of the fiber optic elements, while facilitating flexing of the fiber optic cable. In the alternative embodiment, the textile braid or serve 30 provides improved abrasion resistances for the elongate fiber optic elements. The shield or jacket layer 32 further increases the structural integrity of the fiber optic cable 10 in its resistance to crushing.

While preferred embodiments of a fiber optic cable in accordance with the present invention have been illustrated and described, along with a method of making the same, it will be understood to those skilled in the art that changes and modifications may be made therein without departing from the invention in its broader aspects. Various features of the invention are defined in the following claims.

What is claimed is:

1. A flexible fiber optic cable comprising an elongate strength member, at least one fiber optic element carried by said elongate strength member and helically cabled along the length of said elongate strength member to establish a fiber optic core, and a protective nonmetallic tubular shield layer disposed coaxially along the length of said fiber optic core, said tubular shield layer consisting of a spirally cut integral continuous length axially homogeneous tube of high impact resistant nonmetallic material of uniform transverse cross-sectional area throughout its length spirally wound about said fiber optic core with adjacent helical convolutions in contacting relation when the axis of said cable is straight, said tubular shield being of sufficient radial strength to substantially prevent crushing of said fiber optic elements while facilitating flexing of the cable, said elongate strength member having greater tensile strength and lower elongation per unit length than said at least one fiber optic element so that the major portion of any axial load on said cable is substantially taken by said elongate strength member.

2. A fiber optic cable as defined in claim 1 wherein said elongate strength member is disposed axially of said cable and is made from a nonmetallic material.

3. A fiber optic cable as defined in claim 1 including a nonmetallic textile braid layer disposed coaxially between said fiber optic core and said coaxial spiral tube.

4. A fiber optic cable as defined in claim 1 including a jacket disposed coaxially about said spiral tubular shield along the length of said cable.

5. A flexible fiber optic cable as defined in claim 3 including a jacket disposed coaxially about said spiral tubular shield along the length of said cable.

* * * * *